(12) United States Patent
MacGougan et al.

(10) Patent No.: US 10,778,748 B2
(45) Date of Patent: Sep. 15, 2020

(54) RAPID RECONFIGURATION OF DEVICE LOCATION SYSTEM

(71) Applicant: Apple Inc., Cupertino, CA (US)

(72) Inventors: Glenn Donald MacGougan, San Jose, CA (US); Lukas M. Marti, Santa Clara, CA (US); Robert Mayor, Half Moon Bay, CA (US)

(73) Assignee: APPLE INC., Cupertino, CA (US)

( * ) Notice: Subject to any disclaimer, the term of this patent is extended or adjusted under 35 U.S.C. 154(b) by 265 days.

(21) Appl. No.: 14/846,653

(22) Filed: Sep. 4, 2015

(65) Prior Publication Data

US 2016/0359659 A1 Dec. 8, 2016

Related U.S. Application Data

(60) Provisional application No. 62/171,823, filed on Jun. 5, 2015.

(51) Int. Cl.
| | |
|---|---|
| *H04L 29/08* | (2006.01) |
| *G06F 11/07* | (2006.01) |
| *H04W 4/029* | (2018.01) |
| *G01C 21/20* | (2006.01) |
| *G01C 21/32* | (2006.01) |

(52) U.S. Cl.
CPC ............ *H04L 67/06* (2013.01); *G01C 21/206* (2013.01); *G01C 21/32* (2013.01); *G06F 11/0709* (2013.01); *G06F 11/0751* (2013.01); *G06F 11/0793* (2013.01); *H04L 67/18* (2013.01); *H04W 4/029* (2018.02)

(58) Field of Classification Search
CPC ............ G06F 11/0709; G06F 11/0793; G01C 21/206; G01C 21/3602; G01C 21/32
See application file for complete search history.

(56) References Cited

U.S. PATENT DOCUMENTS

| | | | |
|---|---|---|---|
| 7,103,650 B1 | 9/2006 | Vetrivelkumaran et al. | |
| 7,821,454 B2 | 10/2010 | Xie et al. | |
| 9,204,251 B1* | 12/2015 | Mendelson | ............... G08G 1/14 |
| 9,552,334 B1* | 1/2017 | Meisels | ................ G06F 17/218 |
| 2005/0075116 A1* | 4/2005 | Laird | ....................... A61B 5/04 |
| | | | 455/456.3 |
| 2006/0074558 A1* | 4/2006 | Williamson | ......... G01C 21/165 |
| | | | 701/469 |

(Continued)

*Primary Examiner* — Jigar P Patel
(74) *Attorney, Agent, or Firm* — Jaffery Watson Mendonsa & Hamilton LLP

(57) ABSTRACT

Systems, methods and computer-readable mediums are disclosed for rapid reconfiguration of device location systems. In some implementations, a method comprises: determining, by a server computer, a fault in global location data, the server computer configured to periodically communicate with client devices over a network, the global location data being applicable to multiple client devices and independent of any particular location of any particular client device; determining, by the server computer, a potential impact of the faulty global location data on location systems implemented on the client devices; generating, by the server computer, a reconfiguration file including reconfiguration data for reconfiguring the location systems on the client devices to adapt to the faulty global location data; and automatically sending, by the server computer, the reconfiguration file to the client devices.

24 Claims, 5 Drawing Sheets

(56) References Cited

U.S. PATENT DOCUMENTS

| | | | |
|---|---|---|---|
| 2011/0254729 A1* | 10/2011 | Dutta | G01C 21/165 342/357.3 |
| 2013/0013599 A1* | 1/2013 | Lindstrom | G01C 21/32 707/737 |
| 2014/0171068 A1 | 6/2014 | Marti et al. | |
| 2014/0375493 A1* | 12/2014 | Weisenburger | G01S 19/48 342/357.3 |
| 2015/0039732 A1 | 2/2015 | Mall et al. | |
| 2015/0133152 A1* | 5/2015 | Edge | G01S 5/0236 455/456.1 |
| 2016/0078758 A1* | 3/2016 | Basalamah | G08G 1/0112 701/118 |
| 2016/0189416 A1* | 6/2016 | Naguib | G06T 15/00 345/441 |
| 2016/0282473 A1* | 9/2016 | Driscoll | G01S 19/49 |

* cited by examiner

RAPID RECONFIGURATION OF DEVICE LOCATION SYSTEM

CROSS-REFERENCE TO RELATED APPLICATION

This application claims priority to U.S. Provisional Patent Application No. 62/171,823, entitled "Rapid Reconfiguration of Device Location System," filed Jun. 5, 2015, the entire contents of which are incorporated herein by reference.

TECHNICAL FIELD

This disclosure relates generally to mobile location technology.

BACKGROUND

Location technology systems used by mobile devices can experience faults due to software bugs or external factors. When software bugs are discovered, a fix is prepared for the bugs by the software developer and sent to client devices as a software update. Software developers will often aggregate multiple fixes in a single software update to minimize the number of updates after a software release. This practice can result in a substantial delay between discovery of a bug and the availability of a fix for the bug. Although this practice may be acceptable for non-critical applications, other more critical applications, however, would benefit from a shorter update cycle.

SUMMARY

Systems, methods and computer-readable mediums are disclosed for rapid reconfiguration of device location systems.

In some implementations, a method comprises: determining, by a server computer, a fault in global location data, the server computer configured to periodically communicate with client devices over a network, the global location data being applicable to multiple client devices and independent of any particular location of any particular client device; determining, by the server computer, a potential impact of the faulty global location data on location systems implemented on the client devices; generating, by the server computer, a reconfiguration file including reconfiguration data for reconfiguring the location systems on the client devices to adapt to the faulty global location data; and automatically sending, by the server computer, the reconfiguration file to the client devices.

In some implementations, a system comprises one or more processors and one or more computer-readable mediums or memories storing instructions, which, when executed by the one or more processors, causes the one or more processors to perform operations comprising: determining a fault in global location data, the global location data being applicable to multiple client devices and independent of any particular location of any particular client device; determining a potential impact of the faulty global location data on location systems implemented on the client devices; generating a reconfiguration file including reconfiguration data for reconfiguring the location systems in the client devices to adapt to the faulty global location data; and automatically sending the reconfiguration file to the client devices.

Other implementations are directed to systems, devices and non-transitory, computer-readable storage mediums.

Particular implementations disclosed herein provide one or more of the following advantages. Global location data is centrally monitored by a location data service in the "cloud" for detecting faulty global location data. Reconfiguration files for addressing the faulty data are rapidly generated and distributed by the location data service to multiple client devices operating around the world, resulting in an improved user experience.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example System

Figure 1:
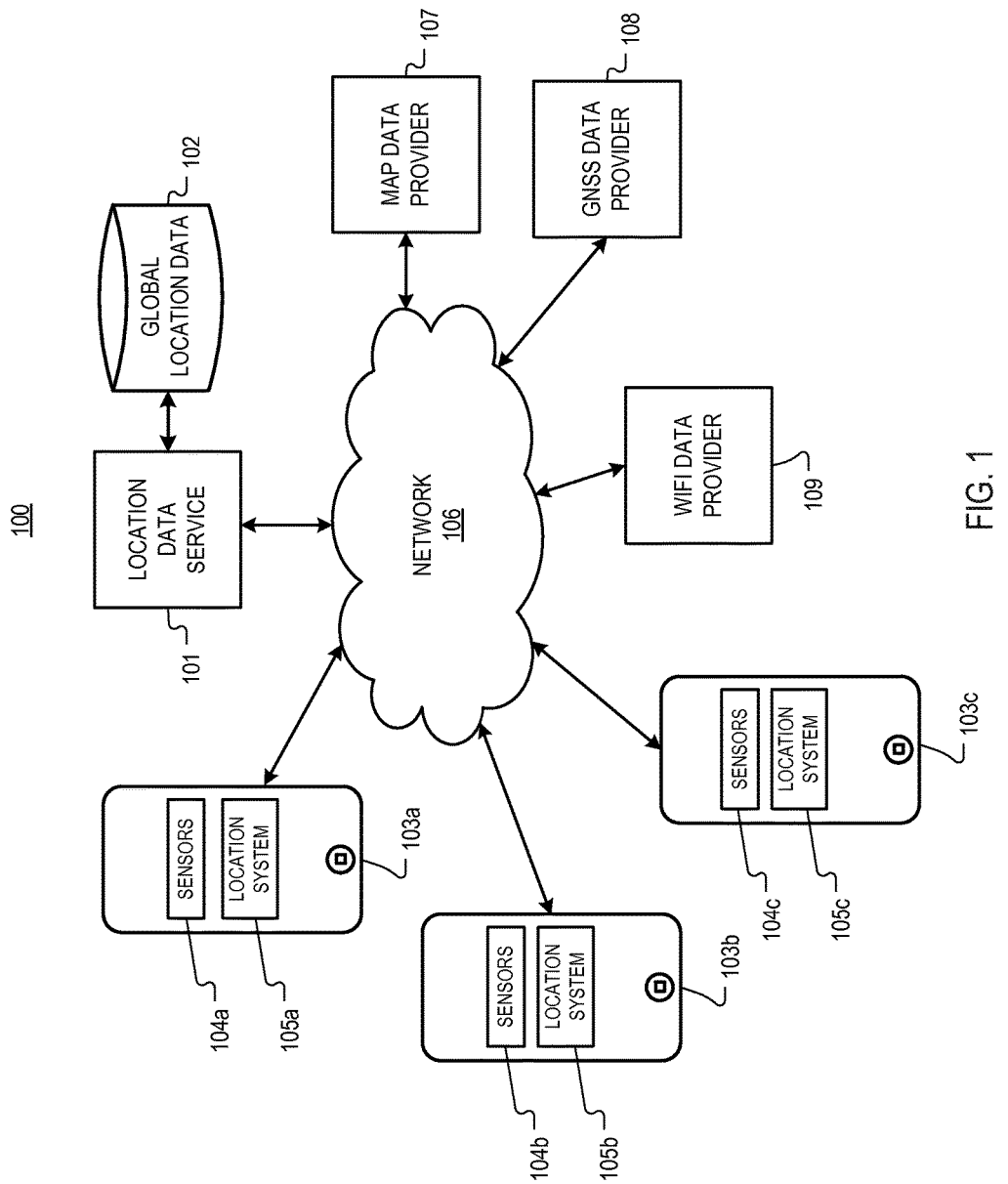
FIG. 1 is a conceptual block diagram of an example system that rapidly reconfigures device location systems.

FIG. 1 is a conceptual block diagram of an example system 100 that rapidly reconfigures device location systems. In some implementations, system 100 can include location data service 101, location data providers 107-109 and client devices 103a-103c. Location data service 101, location data providers 107-109 and client devices 103a-103c communicate with each through network 106 (e.g., the Internet) using wireless or wired communication links.

In some implementations, location data service 101 receives location data from location data providers 107-109, each of which can operate one or more server computers. Providers 107-109 can be operated by a single entity or multiple entities. Some examples of location data include but are not limited to: map data, Global Navigation Satellite System (GNSS) data and WiFi data. Map data provider 107 can be a Web Map Service (WMS) that uses a map server to serve georeferenced map images over network 106. The map images can be generated by using data from a Geographic Information System (GIS) database. Map data provider 107 can also provide ground altitude map data, road vector maps and building models. GNSS data provider 108 can operate one or more server computers that broadcast satellite orbit data (e.g., satellite ephemeris data) over network 106. GNSS satellites include but are not limited to: Global Positioning System (GPS), Globalnaya navigatsionnaya sputnikovaya sistema (GLONASS), Beidou, Quasi-Zenith Satellite System (QZSS), Satellite-Based Augmentation System (SBAS) and GALILEO satellites. WiFi data provider 109 can operate one or more server computers that provide WiFi access point (AP) data (e.g., AP locations, WiFi fingerprints) over network 106. Network 106 can be one or more public or private networks configured to provide wired or wireless data communication services to devices coupled to network 106 using known or proprietary communication protocols. Hereinafter, location data provided by location data providers 107-109 is also referred to as "global location data." Global location data is independent of any particular location of any particular client device.

Client devices 103a-103c can include any location-aware electronic device capable of determining its geographic position in a reference coordinate frame, including but not limited to: smart phones, tablet computers, portable computers, vehicle or aircraft navigation systems and wearable devices (e.g., smart watches). Each client device 103a-103c can include sensors 104a-104c and location systems 105a-105c. Sensors 103a-103c can include but are not limited to: GNSS receivers, accelerometers, gyro sensors, magnetometers, altimeters, barometric pressure sensors and any other inertial navigation system (INS) sensor. Client devices 103a-103c can also include wireless transceivers (e.g., a baseband processor) for wireless communications with APs and other devices and one or more application processors or processing cores for executing operating system functions and client applications.

Location systems 105a-105c can be implemented in client devices 103a-103c by software, hardware or a combination of hardware and software. Location systems 105a-105c process sensor data from sensors 104a-104c and calculate navigation solutions by processing the sensor data using mathematical processes, including but not limited to estimation filters (e.g., Kalman Filter, Particle Filter), step detection (e.g., computed by a pedometer), activity context detection (e.g., moving or stationary, walking, running, driving), pedestrian dead reckoning (PDR) and map or other constraints (e.g., on-road, indoor/outdoor). Location systems 105a-105c can be implemented as a service inside each client device 103a-103c and configured to receive and process raw sensor data and provide the processed data to client applications through, for example, an Application Programming Interface (API).

In some cases, global location data can become corrupted or unavailable. Since global location data is used by a large number of client devices, the corrupted or unavailable global location data can cause system malfunctions on client devices and/or poor user experience. For example, if map data or GNSS data are corrupted or unavailable the navigation applications executing on client devices that rely on this data may provide incorrect navigation solutions. In conventional systems, corrupt or unavailable data may take hours or even weeks after discovery to rectify by, for example, a software update. To address this issue, a rapid reconfiguration of device location systems 105a-105c is disclosed in reference to FIGS. 2-4.

Figure 2:
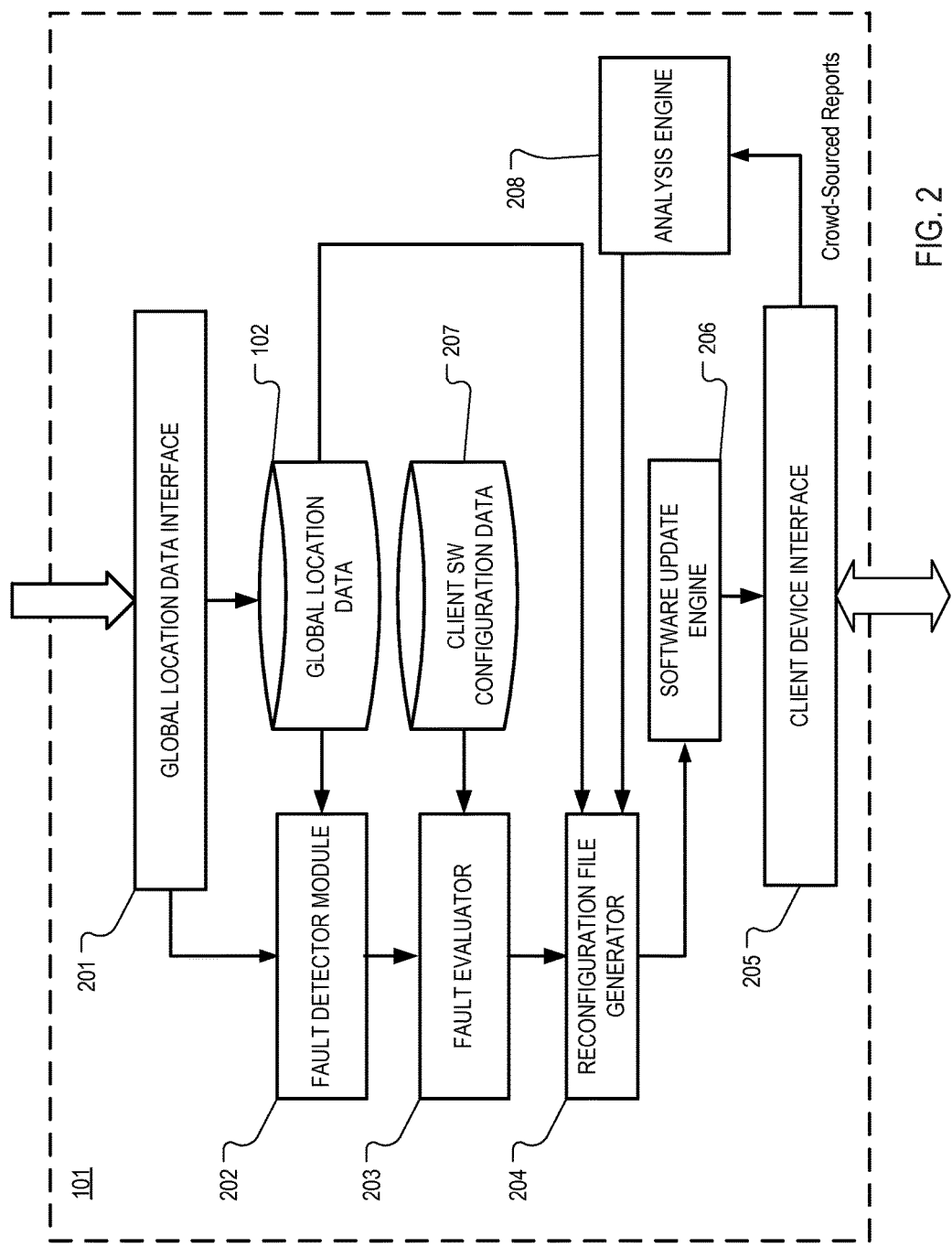
FIG. 2 is a conceptual block diagram illustrating example functional blocks of the location data service shown in FIG. 1.

FIG. 2 is conceptual block diagram illustrating example functional blocks of location data service 101 shown in FIG. 1. In some implementations, location data service 101 can include global location data interface 201, fault detector module 202, fault evaluator 203, reconfiguration file generator 204, software update engine 206, client device interface 205 and analysis engine 208.

Location data interface 201 can include hardware (e.g., server computers) and software (e.g., network operating system, database management software, middleware, communication software) for communicating with location data providers 107-109. In some implementations, location data (e.g., map data, GNSS data) is by third party providers using a data feed (e.g., XML or text data feeds). The location data can be stored in global location data database 102.

In some implementations, fault detector module 202 can be a software program that performs location data verification and validation. In some implementations, fault detector module 202 is used to determine whether location data has been generated according to specifications, satisfy acceptance criteria, and are appropriate and consistent with their intended use.

In some implementations, fault evaluator module 203 can be a software program that determines the impact that faulty location data detected by fault detector module 202 will have on a specific version of a client location system. Fault evaluator module 203 is coupled to a client SW configuration database 207, which stores client software configuration data. Fault evaluator module 203 determines which configuration parameters, flags or code are impacted by the faulty location data and generates a configuration impact report describing which parameters, flags or code of a deployed client location system configuration are to be updated, adapted, tuned, bypassed or replaced.

In some implementations, reconfiguration file generator 204 prepares a reconfiguration file based on the configuration impact report and sends the reconfiguration file to software update engine 206, where it prepared and packaged for download to client devices automatically in response to a trigger event, schedule or in response to request from a client device. In some implementations, the reconfiguration file can include a table of features with associated flags that can be used to enable or disable the feature on client devices. Table I illustrates a simple format for a reconfiguration file for a device location system.

TABLE I

Example Reconfiguration File Format

| LOCATION SYSTEM FEATURE | ENABLE/DISABLE |
|---|---|
| Altitude Aiding | 1 |
| Direction of Travel Aiding | 1 |
| WiFi Positioning Aiding | 1 |
| Map-vector Aiding | 1 |
| GPS | 1 |
| GLONASS | 0 |
| Beidou | 1 |
| QZSS | 1 |
| SBAS | 1 |
| GALILEO | 1 |

In the example illustrated by Table I, Enable/Disable is a Boolean flag, where Set=1 or Unset=0. A fault was detected in GLONASS satellite data, resulting in the GLONASS being disabled (Unset=0). When this reconfiguration file is received by a client device, the location system of the client device will no longer use data from GLONASS satellites. Although this example includes Boolean flags for GNSS features, a reconfiguration file can include flags, one or more bits, new logic/code or any other parameter that can be used to parameterize a feature of location system.

A client software update application executing on each client device, unpacks the reconfiguration file and implements the reconfiguration on the client device by, for example, setting or resetting Boolean flags or bits, replacing parameters used in location system processes and/or updating code. For example, parameters used in estimation or particle filters can be changed. If a Kalman filter is being used as an estimation filter, one or more parameters of a state transition model, control-input model, observation model, measurement covariance and/or process covariance can be updated. For example, if GNSS data is corrupted, the observation model of a Kalman filter can be updated to include only WiFi location data measurements to ensure that the navigation solution remains accurate and stable.

Client device interface 205 can include hardware (e.g., server computers) and software (e.g., network operating system, database management software, middleware, communication software) for communicating with client devices and downloading reconfiguration files.

Analysis engine 208 includes statistical models and processes that are configured to identify systemic errors in "crowd-sourced" data reported by client devices.

Example Processes

Figure 3:
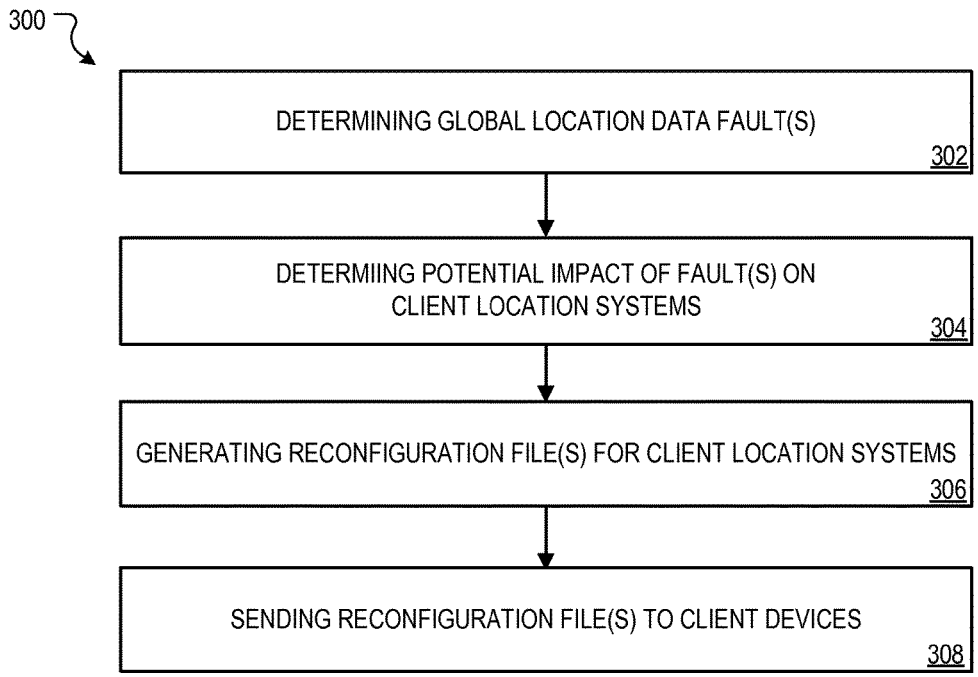
FIG. 3 is a flow diagram of an example process performed by the location data service shown in FIG. 2 to rapidly reconfigure device location systems.

FIG. 3 is a flow diagram of an example process 300 performed by the location data service 101 shown in FIG. 2 to rapidly reconfigure device location systems. Process 300 can be implemented by server computer system architecture 600, as described in reference to FIG. 6.

In some implementations, process 300 can begin by determining global location data faults (302). For example, process 300 can determine whether location data has been generated according to specifications, satisfy acceptance criteria, and are appropriate and consistent with their intended use. The faults can be determined automatically by verification process and/or manually by human operators. In some implementations, hardware faults can be detected. For example, a sensor can be detected as faulty (e.g., a gyro, accelerometer, magnetometer) based on crowd-sourced reports from client devices or information provided by the part manufacturer.

Process 300 can continue by determining the potential impact faulty data can have on a client location system (304). For example, process 300 can determine which configuration parameters, flags or code of a deployed client location system configuration are impacted by the faulty location data and generate a configuration impact report describing which parameters, flags or code of the deployed client location system configuration are to be updated, adapted, tuned, bypassed or replaced.

Process 300 can continue by generating one or more reconfiguration files for deployed client location systems (306). For example, the one or more reconfiguration files can include instructions and/or data for updating an existing software configuration of location systems on deployed client devices by a software update client application executing on the client devices.

Process 300 can continue by sending the one or more reconfiguration files to the client devices (308). For example, a software update engine can format and package the files for transmission over a network to client software update applications executing on client devices. When the package is received by the client device, a software client update application executing on the client device can install the configuration on the client device by, for example, updating or replacing parameters, flags and/or code.

In some implementations, one or more reconfiguration files can be downloaded to client devices on a daily basis with cellular connectivity or every hour with WiFi connectivity. In some implementations, the reconfiguration file(s) can include enable/disable flags for each GNSS satellite that can be used by the location system to enable and disable satellite data for the corresponding satellite from being used in calculating a navigation solution. The reconfiguration file(s) can also include enable/disable flags for specific location system features such as altitude aiding of GNSS, direction of travel aiding of GNS, WiFi position aiding of GNSS, map-vector aiding of GNSS, etc. Additionally, the reconfiguration file(s) can include specific tuning parameters for location system features that would allow improvements in user experience, such as correction of map data, etc.

Figure 4:
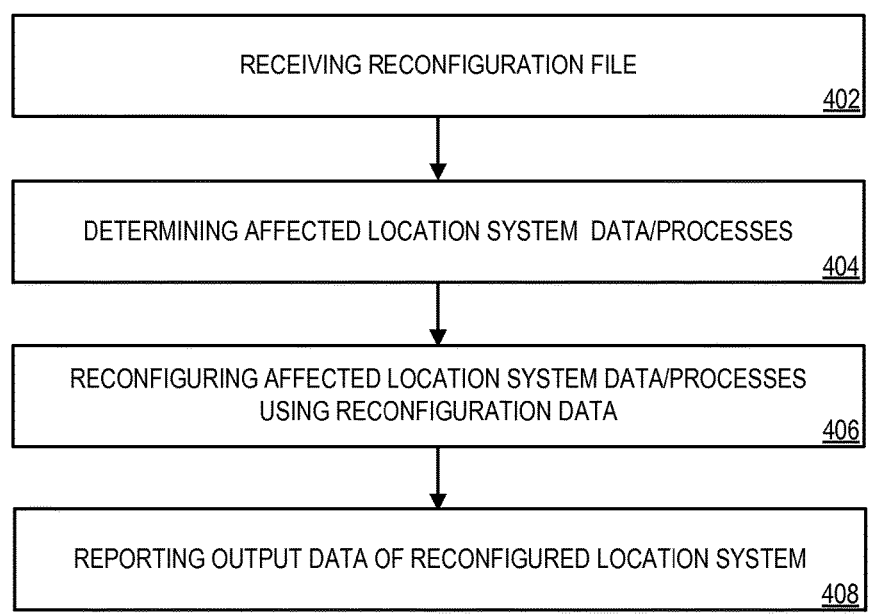
FIG. 4 is a flow diagram of an example process performed by client devices to rapidly reconfigure device location systems.

FIG. 4 is a flow diagram of an example process 400 performed by client devices to rapidly reconfigure device location systems. Process 400 can be implemented by client device architecture 500, described in reference to FIG. 5.

In some implementations, process 400 can begin by receiving one or more reconfiguration files (402). For example, the reconfiguration file(s) can be received by a client software update application executing on the client device.

Process 400 can continue by determining location system data or processes that are impacted by data or instructions in the reconfiguration file(s) (404). For example, the data or instructions in a reconfiguration file can be encoded with a unique identifier or name of a particular software module that can be read by a client software update application executing on the client device. In some implementations, the location system software can be parameterized with various condition statements, flags and variables that can be changed, set, unset or replaced by data or logic/code included in the reconfiguration file.

Process 400 can continue by reconfiguring the impacted portions of the client location system using data or instructions in the reconfiguration file (406). For example, the client software update application executing on the client device (in some cases with some assistance by the device operating system components) can update or replace one or more bits, flags and/or code for the impacted portion of the client location system software code.

Process 400 can (optionally) report data generated by the reconfigured client location system and send the data back to the location data service for verification. For example, a navigation state vector or error covariance of a Kalman filter used for navigation can be sent back to the location data service to determine if the reconfigured client location system is operating as expected. If not operating as expected, a new reconfiguration file can be generated by the location data service and sent to the client device, as described in reference to FIG. 4. This feature enables location data to be "crowd sourced" from many client devices, statistically processed to identify systemic errors across a large sample of client device data and then prepare the appropriate reconfiguration file to rectify any errors. In some implementations, the location data service can run offline simulations using reconfiguration file data to ensure the accuracy of the data before distributing the files to deployed client devices.

Figure 5:
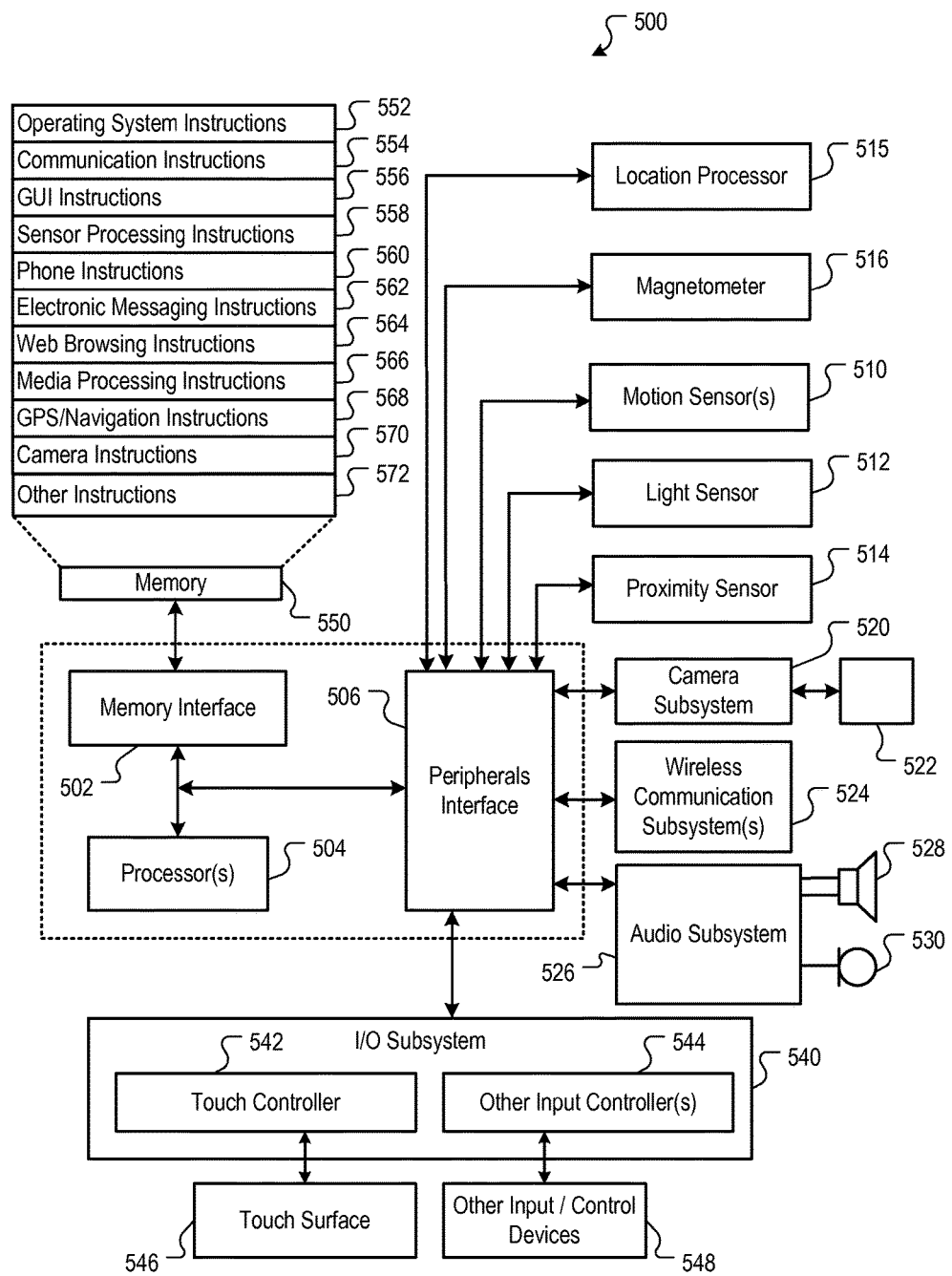
FIG. 5 is a block diagram of example client device architecture for implementing the features and processes described in reference to FIGS. 1-4.

FIG. 5 is a block diagram of example client device architecture 500 for implementing the features and processes described in reference to FIGS. 1-4. Architecture 500 may be implemented in any location aware mobile device for generating the features described in reference to FIGS. 1-4, including but not limited to portable computers, smart phones, tablet computers, game consoles, wearable computers and the like. Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor 510, light sensor 512, and proximity sensor 514 may be coupled to peripherals interface 506 to facilitate orientation, lighting, and proximity functions of the device. For example, in some implementations, light sensor 512 may be utilized to facilitate adjusting the brightness of touch surface 546. In some implementations, motion sensor 510 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 506, such as a temperature sensor, a biometric sensor, or other sensing device, to facilitate related functionalities.

Location processor 515 (e.g., GNSS receiver chip) may be connected to peripherals interface 506 to provide georeferencing. Electronic magnetometer 516 (e.g., an integrated circuit chip) may also be connected to peripherals interface 506 to provide data that may be used to determine the direction of magnetic North. Thus, electronic magnetometer 516 may be used as an electronic compass.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication subsystems 524 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 524 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 526 may be coupled to a speaker 528 and one or more microphones 530 to facilitate voice-enabled functions, such as voice recognition, voice replication, digital recording, and telephony functions.

I/O system 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, device 500 may present recorded audio and/or video files, such as MP3, AAC, and MPEG video files. In some implementations, device 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 may include a kernel (e.g., UNIX kernel).

Memory 550 may also store communication instructions 554 to facilitate communicating with one or more additional devices, one or more computers or servers, including peer-to-peer communications. Communication instructions 554 may also be used to select an operational mode or communication medium for use by the device, based on a geographic location (obtained by the GPS/Navigation instructions 568) of the device. Memory 550 may include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes; camera instructions 570 to facilitate camera-related processes and functions; and other instructions 572 for performing some or all of the processes, as described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs).

Example Server Computer System Architecture

Figure 6:
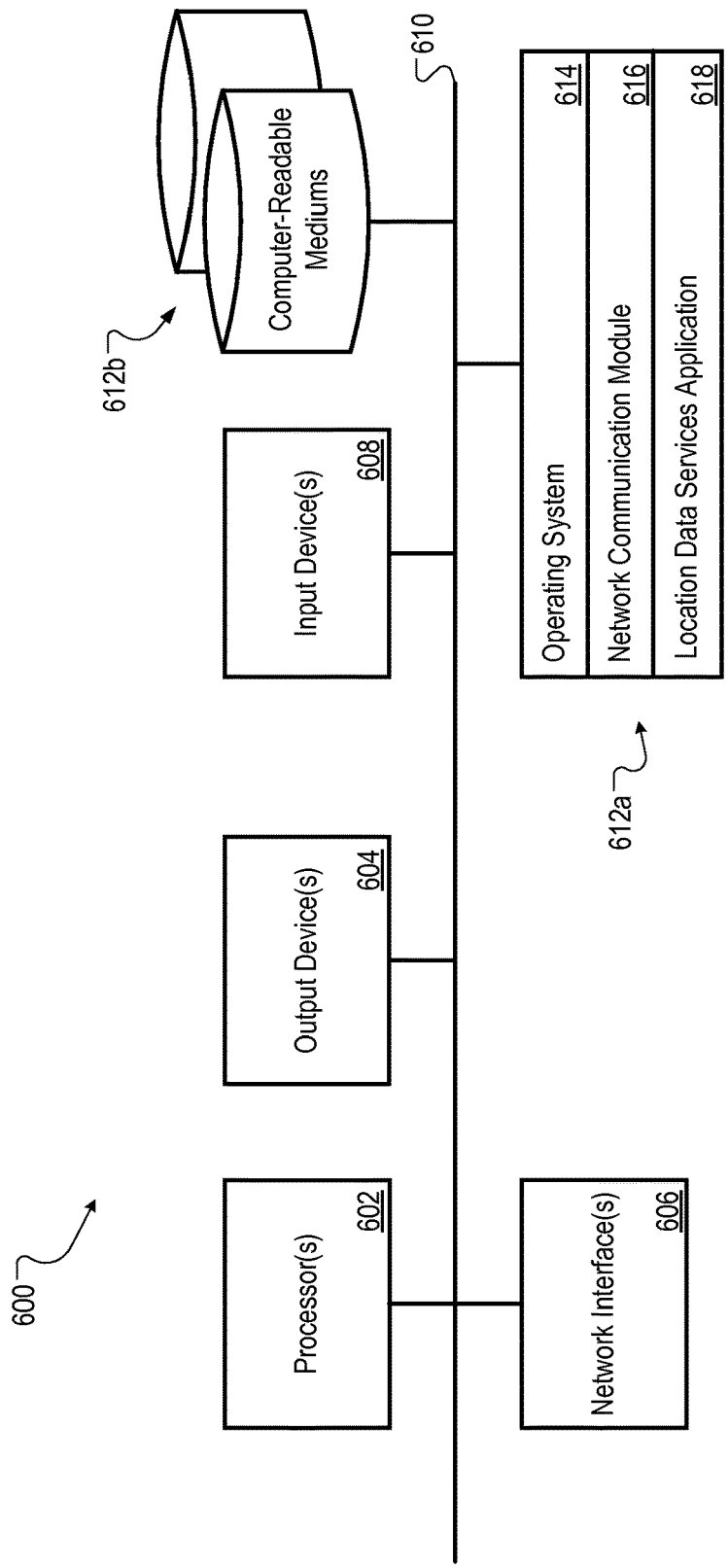
FIG. 6 is a block diagram of example server computer system architecture for implementing the features and processes described in reference to FIGS. 1-4.

FIG. 6 is a block diagram of example server computer system architecture 600 for implementing the features and processes described in reference to FIGS. 1-4. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more non-transitory computer-readable mediums 612b and memory 612a (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "non-transitory computer-readable medium" refers to any medium that participates in providing instructions to processor 602 for execution, including without limitation, non-volatile media (e.g., optical or magnetic disks) and volatile media (e.g., memory).

Computer-readable mediums 612b or memory 612a can further include operating system 614 (e.g., Mac OS® server, Windows® NT server), network communication module 616 and location data services application 618. Operating system 614 can be multi-user, multiprocessing, multitasking, multithreading, real time, etc. Operating system 614 performs basic tasks, including but not limited to: recognizing input from input devices 608 and providing output to output devices 604; keeping track and managing files and directories on storage devices 612b and memory 612a; controlling peripheral devices; and managing traffic on the one or more communication channels 610. Network communications module 616 includes various components for establishing and maintaining network connections (e.g., software for implementing communication protocols, such as TCP/IP, HTTP, etc.). Location data services application 618 provides the features and performs the process, described in reference to FIGS. 1-4.

Architecture 600 can be included in any computer device, including one or more server computers each having one or more processing cores. Architecture 600 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining, by a server computer, a fault in global location data, the server computer configured to periodically communicate with multiple client devices over a network, the global location data being applicable to the multiple client devices and independent of any particular location of any particular one of the multiple client devices;
   determining, by the server computer, a potential impact of the faulty global location data on location systems implemented on the multiple client devices, the faulty global location data used by the location systems to calculate position estimates of the multiple client devices;
   generating, by the server computer, a reconfiguration file including reconfiguration data for reconfiguring the location systems on the multiple client devices to update or bypass the faulty global location data, wherein the reconfiguration data includes data for disabling at least one process that uses the faulty global location data; and
   automatically sending, by the server computer, the reconfiguration file to the multiple client devices.

2. The method of claim 1, wherein the reconfiguration data includes data for modifying or changing processes that rely on the global location data performed by the location systems.

3. The method of claim 1, wherein the reconfiguration data includes data for enabling processes that use the global location data.

4. The method of claim 1, wherein the global location data is satellite data.

5. The method of claim 1, wherein the global location data are wireless access point reference data.

6. The method of claim 1, wherein the global location data are road vector maps.

7. The method of claim 1, wherein the global location data are building models.

8. The method of claim 1, wherein the global location data are ground altitudes.

9. The method of claim 1, wherein the reconfiguration file includes data for enabling or disabling a specific location technology.

10. The method of claim 9, where the specific location technology includes aiding Global Navigation Satellite System (GNSS) receiver data.

11. The method of claim 1, wherein the at least one process comprises a Wi-Fi position aiding process.

12. The method of claim 1, wherein the at least one process comprises a Global Navigation Satellite System (GNSS) location determination process.

13. The method of claim 1, wherein the at least one process comprises at least one of:
   an altitude aiding process,
   a direction of travel aiding process, or
   a map-vector aiding process.

14. A system comprising:
   one or more processors;

one or more computer-readable mediums or memories storing instructions, that when executed by the one or more processors, cause the one or more processors to perform operations comprising:
  determining, by the system, a fault in global location data, the system configured to periodically communicate with multiple client devices over a network, the global location data being applicable to the multiple client devices and independent of any particular location of any particular one of the multiple client devices;
  determining a potential impact of the faulty global location data on location systems implemented on the multiple client devices, the faulty global location data used by the location systems to calculate position estimates of the multiple client devices;
  generating a reconfiguration file including reconfiguration data for reconfiguring the location systems on the multiple client devices to update or bypass the faulty global location data, wherein the reconfiguration data includes data for disabling at least one process that uses the faulty global location data; and
  automatically sending the reconfiguration file to the multiple client devices.

15. The system of claim 14, wherein the reconfiguration data includes data for modifying or changing processes that rely on the global location data performed by the location systems.

16. The system of claim 14, wherein the reconfiguration data includes data for enabling processes that use the global location data.

17. The system of claim 14, wherein the global location data is satellite data.

18. The system of claim 14, wherein the global location data are wireless access point reference data.

19. The system of claim 14, wherein the global location data are road vector maps.

20. The system of claim 14, wherein the global location data are building models.

21. The system of claim 14, wherein the global location data are ground altitudes.

22. The system of claim 14, wherein the reconfiguration file includes data for enabling or disabling a specific location technology.

23. The system of claim 22, wherein the specific location technology includes aiding Global Navigation Satellite System (GNSS) receiver data.

24. A non-transitory, computer-readable storage medium having stored thereon instructions, which, when executed by one or more processors, cause the one or more processors to perform operations comprising:
  determining, by a server computer, a fault in global location data, the server computer configured to periodically communicate with multiple client devices over a network, the global location data being applicable to the multiple client devices and independent of any particular location of any particular one of the multiple client devices;
  determining a potential impact of the faulty global location data on location systems implemented on the multiple client devices, the faulty global location data used by the location systems to calculate position estimates of the multiple client devices;
  generating a reconfiguration file including reconfiguration data for reconfiguring the location systems on the multiple client devices to update or bypass the faulty global location data, wherein the reconfiguration data includes data for disabling at least one process that uses the faulty global location data; and
  automatically sending the reconfiguration file to the multiple client devices.

* * * * *